US009527008B2

(12) United States Patent
Hoehn et al.

(10) Patent No.: US 9,527,008 B2
(45) Date of Patent: Dec. 27, 2016

(54) APPARATUS FOR MEASUREMENT AND CALCULATION OF DEW POINT FOR FRACTIONATION COLUMN OVERHEADS

(75) Inventors: Richard K. Hoehn, Mt. Prospect, IL (US); James W. Harris, Aurora, IL (US); Amit Goyal, Gurgoan (IN); Xin X. Zhu, Long Grove, IL (US)

(73) Assignee: UOP LLC, Des Plaines, IL (US)

( * ) Notice: Subject to any disclaimer, the term of this patent is extended or adjusted under 35 U.S.C. 154(b) by 797 days.

(21) Appl. No.: 13/558,887

(22) Filed: Jul. 26, 2012

(65) Prior Publication Data

US 2014/0027266 A1 Jan. 30, 2014

(51) Int. Cl.
*B01D 3/42* (2006.01)
*B01D 3/32* (2006.01)

(52) U.S. Cl.
CPC ............ *B01D 3/4216* (2013.01); *B01D 3/32* (2013.01); *B01D 3/42* (2013.01); *B01D 3/4205* (2013.01)

(58) Field of Classification Search
CPC ............. B01D 3/14; B01D 3/007; B01D 3/38; B01D 3/4211–3/4255; C10G 7/00; C10G 7/12; C10G 2300/807
USPC ...... 202/158, 160, 206; 203/1, 2, 12, 23, 96, 203/98, DIG. 18; 700/270, 271, 282
See application file for complete search history.

(56) References Cited

U.S. PATENT DOCUMENTS

| | | | |
|---|---|---|---|
| 3,296,097 A * | 1/1967 | Lupfer | 203/2 |
| 4,295,196 A * | 10/1981 | Furr | 700/270 |
| 6,640,161 B1 | 10/2003 | Hoehn | |
| 7,794,140 B2 | 9/2010 | Botros et al. | |
| 2003/0032189 A1 | 2/2003 | Lloyd et al. | |
| 2011/0168377 A1 * | 7/2011 | Alers et al. | 165/200 |

OTHER PUBLICATIONS

"Mass Flowmeters." OMEGA Engineering. N.p., Mar. 12, 2010. Web. Nov. 6, 2014.*
Clifford, Michael. (2006). Introduction to Mechanical Engineering—Part 1—4.4.1 Mass Conservation and Mass Flow Continuity. Taylor & Francis. p. 234. Online version available at: http://app.knovel.com/hotlink/pdf/id:kt00C8U859/introduction-mechanical/mass-conservation-mass.*
Shokir, Eissa M.El-M., "Dewpoint pressure model for gas condensate reservoirs based on genetic programming" Energy and Fuels, v 22, n 5, p. 3194-3200, Sep./Oct. 2008.

* cited by examiner

*Primary Examiner* — Bobby Ramdhanie
*Assistant Examiner* — Jonathan Miller

(57) ABSTRACT

Apparatus for controlling the operation of fractionation columns to avoid column flooding is described. The apparatus uses mass flow meters to measure the mass flow rates of the receiver vapor, and the stripper hydrocarbon liquid stream or the stripper reflux and the stripper net overhead liquid. The water from the receiver can be measured with either a volumetric flow meter or a mass flow meter. The apparatus also includes at least one computer in communication with a molecular weight analyzer or specific gravity analyzer; an overhead vapor line pressure gauge; an overhead vapor line temperature gauge; a hydrocarbon liquid outlet line temperature gauge; the stripper hydrocarbon stream mass flow meter, or the stripper reflux hydrocarbon liquid mass flow meter and the stripper net overhead hydrocarbon liquid mass flow meter; the vapor mass flow meter; and the water flow meter.

15 Claims, 3 Drawing Sheets

APPARATUS FOR MEASUREMENT AND CALCULATION OF DEW POINT FOR FRACTIONATION COLUMN OVERHEADS

STATEMENT OF RELATED CASES

This application is related to application Ser. No. 13/558,896, filed on even date, entitled METHOD FOR MEASUREMENT AND CALCULATION OF DEW POINT FOR FRACTIONATION COLUMN OVERHEADS, which is incorporated herein by reference.

FIELD OF THE INVENTION

This invention relates to generally to fractionation columns and more particularly to apparatus and methods for controlling the operation of fractionation columns to avoid column flooding.

BACKGROUND OF THE INVENTION

Many different applications in the hydrocarbon refining and petrochemical industries employ the use of steam strippers to remove lower boiling compounds from liquid streams containing various boiling range compounds. The introduction of steam into a steam stripped fractionation column is beneficial for the separation of different boiling compounds. However, if too much steam is added for the amount of heat available in the column, steam will condense on the stripper trays where water builds up and eventually floods the stripper, causing major operational upsets. The presence of liquid water also leads to increased corrosion of the trays and walls of the stripper column.

U.S. Pat. No. 6,640,161, which is incorporated herein by reference, describes a computer method for calculating the dew point and providing a warning of operating conditions which may lead to flooding of the column. The total moles of hydrocarbon passing overhead in the steam stripped fractionation column and the total moles of water as steam passing overhead in the steam stripped fractionation column are measured. Using that information, the mole fraction of water as steam passing overhead in the column is continuously calculated. The overhead pressure of the column is measured, and a continuous determination of the partial pressure of water is made by calculating the product of the mole fraction of water as steam passing overhead in the column and the column overhead pressure. In addition, a continuous determination of the dew point temperature of the steam passing overhead in the column is made. The top temperature of the column is measured and provided to the computer wherein the difference between the calculated dew point temperature of the steam passing overhead in the column and the measured top temperature is calculated. As this calculated difference approaches zero, the potential for flooding the column increases. A predetermined value is selected and compared with the calculated difference in order to generate an alarm to alert the operator of unsatisfactory column operation. Once an alarm is detected, the operator may then make the appropriate adjustments to the column in order to avoid flooding the column.

However, U.S. Pat. No. 6,640,161 does not describe the instrumentation and connections among the instruments needed to make the needed measurements. Without the proper instrumentation, the calculation method will not report useful information and flooding conditions can occur. This leads to expensive repairs and lost production.

Therefore, there is a need for instrumentation for, and methods of, calculating water dew point in a steam stripped fractionation column.

SUMMARY OF THE INVENTION

One aspect of the present invention relates to apparatus for controlling fractionation column operation. In one embodiment, the apparatus includes a fractionation column having an overhead outlet and a reflux inlet and a receiver having an inlet, a water outlet, a hydrocarbon liquid outlet, and a vapor outlet. There is an overhead vapor line connecting the overhead outlet of the fractionation column with the inlet of the receiver. A molecular weight analyzer or a specific gravity analyzer, a temperature gauge, and a pressure gauge are in communication with the overhead vapor line. There is a hydrocarbon liquid outlet line connected to the hydrocarbon liquid outlet of the receiver, which splits into a stripper reflux line connected to the reflux inlet of the fractionation column and a stripper net overhead liquid line. There is a temperature gauge in communication with the hydrocarbon liquid outlet line. There is a stripper hydrocarbon liquid mass flow meter in fluid communication with the hydrocarbon liquid outlet line, or a stripper reflux hydrocarbon liquid mass flow meter in communication with the stripper reflux line, and a stripper net overhead hydrocarbon liquid mass flow meter in communication with the stripper net overhead liquid line. There is a stripper vapor mass flow meter in communication with a vapor outlet line from the vapor outlet of the receiver. There is a water flow meter in communication with a water outlet line from the water outlet of the receiver. The apparatus also includes at least one computer in communication with the molecular weight analyzer or specific gravity analyzer; the overhead vapor line pressure gauge; the overhead vapor line temperature gauge; the hydrocarbon liquid outlet line temperature gauge; the stripper hydrocarbon liquid mass flow meter or the stripper reflux hydrocarbon liquid mass flow meter and the stripper net overhead hydrocarbon liquid mass flow meter; the stripper vapor mass flow meter; and the water flow meter.

DETAILED DESCRIPTION OF THE INVENTION

The present invention helps to prevent undesirable condensation of steam by providing the operator with an alarm that warns of conditions that approach the water dew point so that the appropriate adjustments can be made before the stripper column is upset. It identifies the instrumentation needed and the appropriate calculations to determine the dew point and dew point margin in real time, allowing for proper control and operation of the column, which helps to minimize energy consumption.

The approach provides simple calculations which are easily configured within common control systems for on-line water dew point margin indication in real time. The overhead flow from the column is determined by measuring receiver vapor, receiver water boot, reflux hydrocarbon liquid, and net overhead hydrocarbon liquid. The receiver vapor, reflux hydrocarbon liquid, and net overhead hydrocarbon liquid are measured using mass flow meters, such as coriolis flow meters. The mass flow meters provide information to the calculation method that is not impacted by differences or changes in specific gravity. Mass flow meters are only used where they are most needed to limit the cost of the flow meters. For example, the water boot mass flow can be found by correcting the volume flow by the actual operating temperature (although a mass flow meter can be used if desired). The molar flow in the overhead is determined by converting the mass flow to molar flow from the molecular weight analyzer or specific gravity (SG) analyzer in the overhead vapor line. The water content of the overhead system is calculated assuming the water content of the overhead is all in the water leaving the receiver water boot, thus directly determining the column overhead water dew point.

The instrumentation can be used in both new and existing processes. With existing processes, instruments may need to be added and/or different instruments may need to be installed at certain points in the system in order to apply it.

Figure 1:
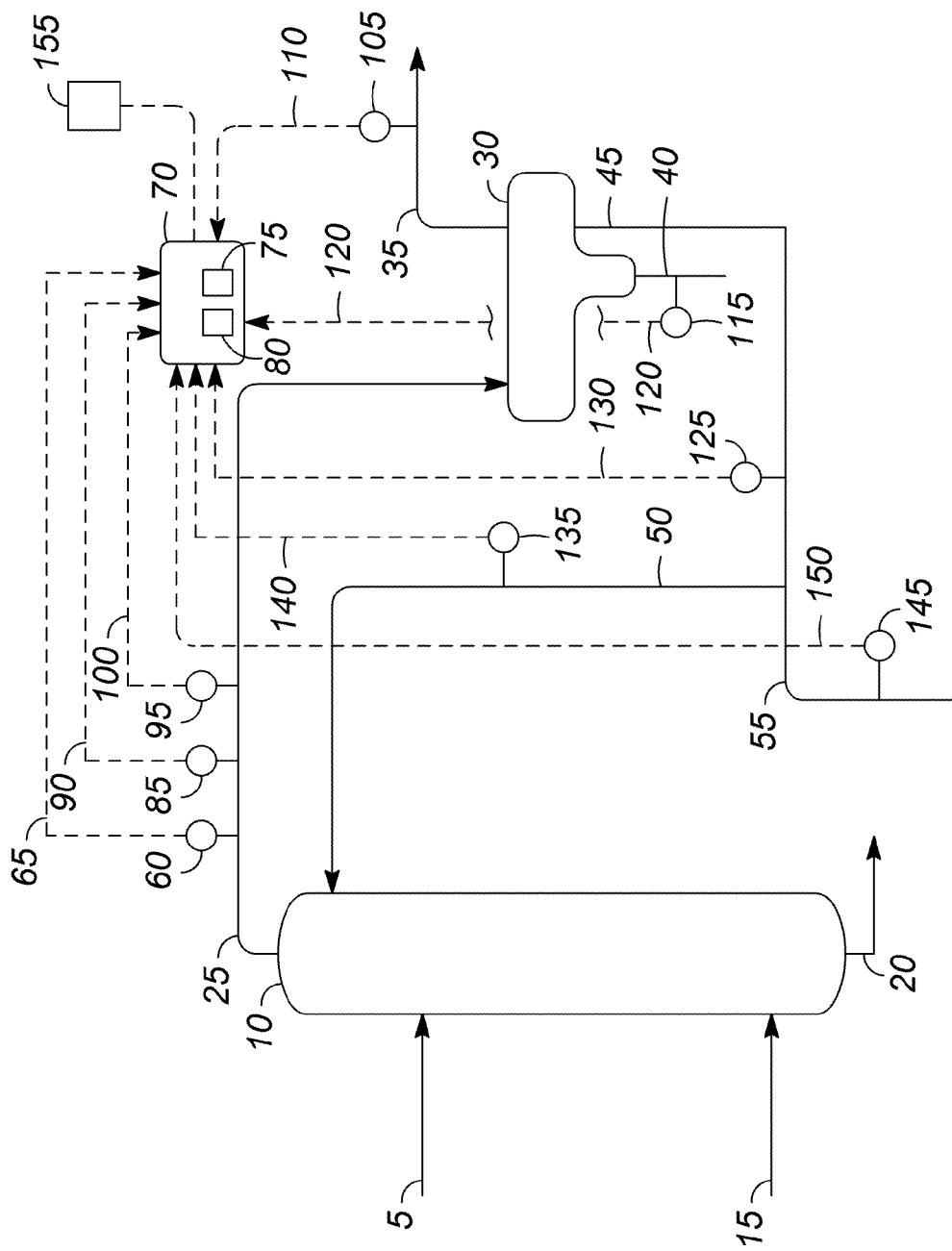
FIG. 1 illustrates one embodiment of the control instrumentation for the steam stripped fractionation column.

The control instrumentation for the steam stripped fractionation column is illustrated in FIG. 1. A hydrocarbon feed 5 is introduced into the fractionation column 10. Steam 15 is introduced into the fractionation column 10 and travels upward to strip volatile components from the downward flowing hydrocarbon feed 5. A hydrocarbon product stream 20 having a reduced concentration of volatile components is removed from the bottom of the fractionation column 10 and recovered. A vapor stream containing lower molecular weight hydrocarbons which have been stripped from the feed and steam is removed from the fractionation column 10, cooled, and sent to receiver 30 through overhead vapor line 25.

The stream entering receiver 30 includes steam condensate, liquid hydrocarbons, and normally gaseous hydrocarbons. A sour gas stream containing gaseous hydrocarbons is removed from the receiver 30 through receiver vapor outlet line 35 and recovered. Steam condensate is removed from receiver 30 through water outlet line 40 and recovered. A liquid hydrocarbon stream is removed from the receiver 30 through hydrocarbon liquid outlet line 45, which splits into lines 50 and 55. A portion of the liquid hydrocarbon stream is sent to the fractionation column 10 through stripper reflux line 50 as reflux. Another portion of the liquid hydrocarbon stream is recovered as net hydrocarbon liquid through stripper net overhead line 55.

There is a molecular weight analyzer or a specific gravity analyzer 60 in communication with overhead vapor line 25 to measure the molecular weight or specific gravity of the overhead vapor stream from the fractionation column 10. The molecular weight analyzer or specific gravity analyzer 60 sends the molecular weight or specific gravity measurements through line 65 to a computer 70. The computer 70 includes at least a storage unit 75 and a calculating unit 80.

Pressure gauge 85, which is in communication with overhead line 25, measures the pressure of the overhead vapor stream from the fractionation column 10, and sends the pressure measurements to the computer 70 through line 90.

Temperature gauge 95, which is in communication with overhead line 25, measures the temperature of the overhead vapor stream from the fractionation column 10, and sends the temperature measurements to the computer 70 through line 100.

Stripper vapor mass flow meter 105 measures the mass flow of the sour gas stream in receiver vapor outlet line 35, and sends the mass flow measurements to the computer 70 through line 110.

Water flow meter 115 measures the flow of the steam condensate in line 40 and sends the flow measurements to the computer 70 through line 120. The water flow meter can be a volumetric flow meter or a mass flow meter, as desired. The weight flow of water is needed, but it can either be measured directly with a mass flow meter, or be calculated from a volumetric flow corrected for temperature using the steam table specific gravity. Suitable mass flow meters include, but are not limited to, coriolis mass flow meters. Suitable volumetric flow meters include, but are not limited to, orifice plate flow meters.

Hydrocarbon liquid outlet temperature gauge 125 measures the temperature of the liquid hydrocarbon stream in hydrocarbon liquid outlet line 45 and sends the temperature measurements to the computer 70 through line 130. Alternatively, hydrocarbon liquid outlet temperature gauge 125 could be located on either the stripper reflux line 50 or the stripper net overhead line 55.

Stripper reflux hydrocarbon liquid mass flow meter 135 measures the mass flow of the liquid hydrocarbon reflux stream in line 50 and sends the mass flow measurements to the computer 70 through line 140.

Stripper net overhead hydrocarbon liquid mass flow meter 145 measures the mass flow of the net overhead liquid hydrocarbon stream in line 55 and sends the mass flow measurements to the computer 70 through line 150.

Figure 2:
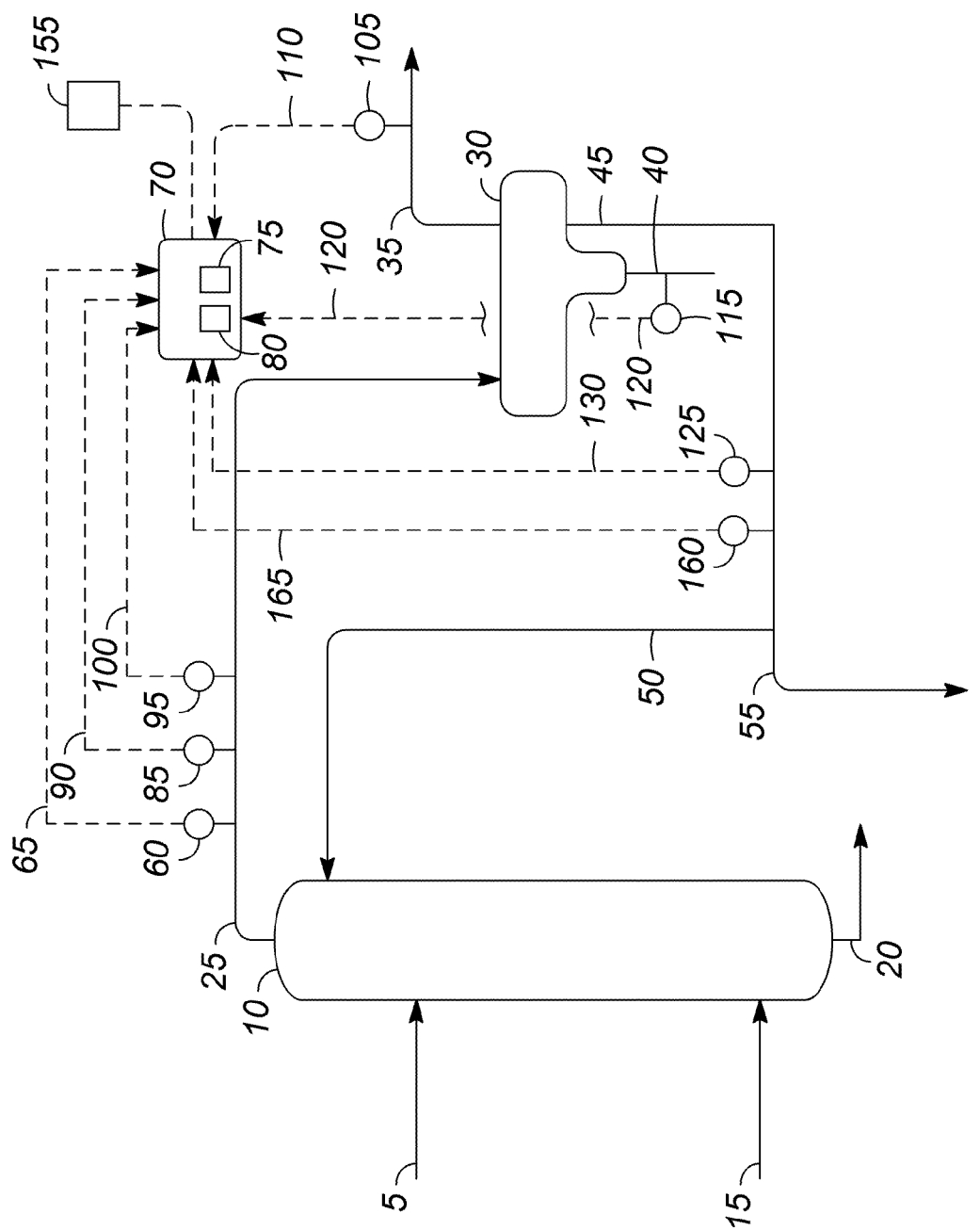
FIG. 2 illustrates another embodiment of the control instrumentation for the steam stripped fractionation column.

Alternatively, as shown in FIG. 2, instead of measuring the mass flow of the liquid hydrocarbon reflux stream in line 50 and the net overhead liquid hydrocarbon stream in line 55 separately, the stripper hydrocarbon liquid mass flow meter 160 measures the mass flow of the liquid hydrocarbon stream in the hydrocarbon outlet line 45 and sends the mass flow measurements to the computer 70 through line 165.

Figure 3:
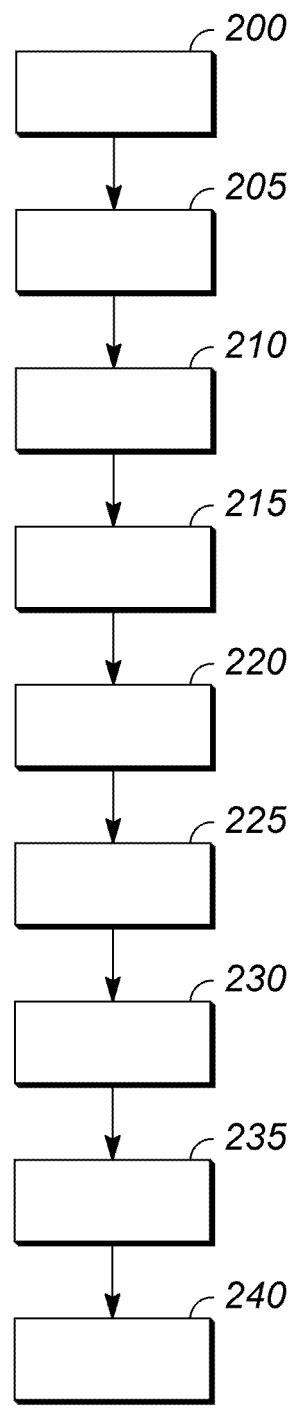
FIG. 3 illustrates the steps of one embodiment of the control method.

The control method is illustrated in FIG. 3. The various measurements described above are made and sent to the computer 70 in step 200 for use in the calculation of the dew point margin.

The dew point margin can be determined using the following equations. First, the total overhead flow is calculated in step 205. This can be done using equation 1a or 1b, depending on whether the mass flow of the mass flow of the liquid hydrocarbon stream 45 is measured, or and the mass flow of the liquid hydrocarbon reflux stream 135 and the mass flow of the net overhead liquid hydrocarbon stream 145 are measured.

$$TOF = WFR + RVF + HLF \quad (1a)$$

$$TOF = WFR + RVF + NOLF + RF \quad (1b)$$

Where:
TOF=total overhead flow (mass flow)
WFR=measured water flow rate of the water stream from the receiver (either measured as mass flow or converted to mass flow–from water flow meter 115)
RVF=measured mass flow rate of the stripper vapor stream from the receiver (from stripper vapor mass flow meter 105)

HLF=measured mass flow rate of the hydrocarbon liquid stream from the receiver (from stripper hydrocarbon liquid mass flow meter 160)
NOLF=measured mass flow rate of the stripper net overhead hydrocarbon liquid flow (from stripper net overhead hydrocarbon liquid mass flow meter 145)
RF=measured mass flow rate of the reflux hydrocarbon liquid stream (from stripper reflux hydrocarbon liquid mass flow meter 135).

Next, the total overhead moles are calculated in step 210. This calculation can be performed using equation 2.

$$TOM = TOF/MWov \qquad (2)$$

Where:
TOM=total overhead moles
TOF=total overhead flow (mass flow from equation 1)
MWov=molecular weight of the overhead stream (from molecular weight analyzer 60 or calculated from equation 3).

MWov can be calculated using equation 3 if a specific gravity analyzer 60 is used.

$$MWov = \frac{\rho_{ov} RTa}{Pa} \qquad (3)$$

Where:
$MW_{ov}$=molecular weight of the overhead vapor
$\rho_{ov}$=density of the overhead vapor (from specific gravity analyzer 60)
R=universal gas constant
Ta=absolute temperature of the overhead vapor (from temperature gauge 95+absolute temperature conversion factor)
Pa=absolute pressure of the overhead vapor (from pressure gauge 85+absolute pressure conversion factor).

The absolute temperature conversion factor for temperature measured in ° F. is 460° F. The absolute pressure conversion factor for pressure measure in psia is 14.7 psia. Those of skill in the art can determine the appropriate absolute temperature and pressure conversion factors for other temperature and pressure units. Next the total moles of water are determined in step 215. This can be calculated using equation 4a or 4b, depending on whether a mass flow meter or a volumetric flow meter is used.

$$TMW = (WFR)/18.015 \qquad (4a)$$

Where:
TMW=total moles of water
WFR=measured mass flow rate of the water stream from the receiver (from water flow meter 115).

$$TMW = (VFR*\rho)/18.015 \qquad (4b)$$

Where:
VFR is the volume flow rate in consistent units
$\rho$=density of water at the measured temperature of the hydrocarbon liquid stream from the receiver (from temperature gauge 125)
18.015=molecular weight of water.

Next, the partial pressure of water in the overhead stream is determined at step 220. This can be calculated using equation 5.

$$PPWO = (TMW/TOM)*OP \qquad (5)$$

Where:
PPWO=partial pressure of water in the overhead vapor stream in psia
TMW=total moles of water from equation 4a or 4b
TOM=total overhead moles from equation 2
OP=measured pressure of the overhead vapor stream (from pressure gauge 85) in psia.

The saturation temperature (water dew point) is determined at step 225. It can be determined according to equation 6 using the steam tables stored in the computer.

$$WDP = \text{Temperature at } PPWO \qquad (6)$$

Where:
WDP=water dew point, in ° F.
PPWO=partial pressure of water in the overhead vapor stream, in psia.

Alternatively, the dew point can be calculated using equation 7, which can be programmed into the computer. Equation 7 has been verified for multiple points, and it is accurate to within 0.5° C. (1° F.). The error decreases at saturation temperatures above 150° C. (302° F.).

$$WDP = 0.20 + 118.084 \times (PPWO(\text{psia}))^{0.2215} \qquad (7)$$

Where:
WDP=water dew point (° F.)
PPWO=partial pressure of water in the overhead vapor stream in psia (from equation 5).

Next, the dew point margin is determined at step 230. It can be calculated using equation 8.

$$DPM = OT - WDP \qquad (8)$$

Where:
DPM=dew point margin
OT=measured operating temperature (from temperature gauge 95)
WDP=water dew point from equation 6 or 7.

At step 235, the DPM is compared to a predetermined minimum dew point margin. The predetermined minimum dew point margin is selected for safe operation of the column. If DPM is less than the predetermined dew point margin, an alarm 155 is triggered by the computer 70 at step 240 or an operating condition is changed, or both. The change in operating condition can be performed by the computer or by the operator or both. Changes in operating condition can include, but are not limited to, changing an operating condition of the fractionation column to change the measured temperature of the overhead vapor stream, such as changing the heat input to the fractionation column.

Desirably, the measurements and calculations are continually performed by the apparatus. However, it is within the scope of the invention to take measurements and/or perform the calculations at regularly set intervals, e.g., every sec, every 30 sec, every min, every 5 min, etc., or irregularly set intervals, e.g., every 5 min, and if the DPM decreases past a pre-set limit, increasing the interval to every 30 sec, for example.

The apparatus eliminates a total overhead liquid flow meter and uses reflux and net overhead liquid mass flow meters instead.

The calculations are simplified because molar flow rates can be calculated directly without having to convert volumetric flow rates.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. Apparatus for controlling fractionation column operation comprising;
   a fractionation column having an overhead outlet and a reflux inlet;
   a receiver having an inlet, a water outlet, a hydrocarbon liquid outlet, and a vapor outlet;
   an overhead vapor line connecting the overhead outlet of the fractionation column with the inlet of the receiver;
   a molecular weight analyzer or specific gravity analyzer, a first temperature gauge, and a pressure gauge in communication with the overhead vapor line;
   a hydrocarbon liquid outlet line connected to the hydrocarbon liquid outlet of the receiver, the hydrocarbon liquid outlet line splitting into a stripper reflux line connected to the reflux inlet of the fractionation column and a stripper net overhead liquid line;
   a second temperature gauge in communication with the hydrocarbon liquid outlet line;
   a stripper hydrocarbon liquid mass flow meter in fluid communication with the hydrocarbon liquid outlet line, or a stripper reflux hydrocarbon liquid mass flow meter in communication with the stripper reflux line and a stripper net overhead hydrocarbon liquid mass flow meter in communication with the stripper net overhead liquid line;
   a stripper vapor mass flow meter in communication with a vapor outlet line from the vapor outlet of the receiver;
   a water flow meter in communication with a water outlet line from the water outlet of the receiver; and
   at least one computer in communication with the molecular weight analyzer or specific gravity analyzer; the overhead vapor line pressure gauge; the overhead vapor line temperature gauge; the hydrocarbon liquid outlet line temperature gauge; the stripper hydrocarbon liquid mass flow meter or the stripper reflux hydrocarbon liquid mass flow meter and the stripper net overhead hydrocarbon liquid mass flow meter; the stripper vapor mass flow meter; and the water flow meter, said computer for calculating a dew point margin in the overhead vapor line and triggering an alarm or changing an operating condition in the fractionation column, or both, if the dew point margin is less than a predetermined minimum dew point margin.

2. The apparatus of claim 1 wherein the water flow meter is a volumetric flow meter.

3. The apparatus of claim 1 wherein the water flow meter is an orifice plate flow meter.

4. The apparatus of claim 1 wherein the water flow meter is a mass flow meter.

5. The apparatus of claim 4 wherein the mass flow meter is a coriolis mass flow meter.

6. The apparatus of claim 1 wherein at least one of the stripper hydrocarbon liquid mass flow meter, the stripper reflux hydrocarbon liquid mass flow meter, the stripper net overhead hydrocarbon liquid mass flow meter, and the stripper vapor mass flow meter is a coriolis mass flow meter.

7. The apparatus of claim 1 wherein the stripper hydrocarbon liquid mass flow meter is present.

8. The apparatus of claim 1 wherein the stripper reflux hydrocarbon liquid mass flow meter and the stripper net overhead hydrocarbon liquid mass flow meter are present.

9. Apparatus for controlling fractionation column operation comprising;
   a fractionation column having an overhead outlet and a reflux inlet;
   a receiver having an inlet, a water outlet, a hydrocarbon liquid outlet, and a vapor outlet;
   an overhead vapor line connecting the overhead outlet of the fractionation column with the inlet of the receiver;
   a molecular weight analyzer or specific gravity analyzer, a first temperature gauge, and a pressure gauge in communication with the overhead vapor line;
   a hydrocarbon liquid outlet line connected to the hydrocarbon liquid outlet of the receiver, the hydrocarbon liquid outlet line splitting into a stripper reflux line connected to the reflux inlet of the fractionation column and a stripper net overhead liquid line;
   a second temperature gauge in communication with the hydrocarbon liquid outlet line;
   a stripper reflux hydrocarbon liquid coriolis mass flow meter in communication with the stripper reflux line;
   a stripper hydrocarbon liquid coriolis mass flow meter in fluid communication with the hydrocarbon liquid outlet line, or a stripper net overhead hydrocarbon liquid coriolis mass flow meter in communication with the stripper net overhead liquid line and a stripper vapor coriolis mass flow meter in communication with a vapor outlet line from the vapor outlet of the receiver;
   a water flow meter in communication with a water outlet line from the water outlet of the receiver; and
   at least one computer in communication with the molecular weight analyzer or specific gravity analyzer; the overhead line pressure gauge; the overhead line temperature gauge; the second temperature gauge; the stripper hydrocarbon liquid coriolis mass flow meter or the stripper reflux hydrocarbon liquid coriolis mass flow meter and the stripper net overhead hydrocarbon liquid coriolis mass flow meter; the stripper vapor mass flow meter; and the water flow meter, said computer for calculating a dew point margin in the overhead vapor line and triggering an alarm or changing an operating condition in the fractionation column, or both, if the dew point margin is less than a predetermined minimum dew point margin.

10. The apparatus of claim 9 wherein the water flow meter is a volumetric flow meter.

11. The apparatus of claim 9 wherein the water flow meter is an orifice plate flow meter.

12. The apparatus of claim 9 wherein the water flow meter is a mass flow meter.

13. The apparatus of claim 12 wherein the mass flow meter is a coriolis mass flow meter.

14. The apparatus of claim 9 wherein the stripper hydrocarbon liquid coriolis mass flow meter is present.

15. The apparatus of claim 9 wherein the stripper reflux hydrocarbon liquid mass flow meter and the stripper net overhead hydrocarbon liquid coriolis mass flow meter are present.

* * * * *